Oct. 26, 1965     S. B. APPLEBAUM     3,214,021
FILTERING APPARATUS

Filed Nov. 2, 1962     2 Sheets-Sheet 2

INVENTOR.
SAMUEL B. APPLEBAUM
BY
ATTORNEYS 3,214,021
FILTERING APPARATUS
Samuel B. Applebaum, % Cochrane Division Crane Co.,
17th St., below Allegheny Ave., Philadelphia 32, Pa.
Filed Nov. 2, 1962, Ser. No. 235,017
8 Claims. (Cl. 210—108)

This invention relates to filtering apparatus, and, particularly, to a system including a plurality of wrap-around valveless filters which are integral with a liquid treatment unit such as a reactor or clarifier.

The present system is further characterized by individual and fully automatic backwashing of the individual filter units from which the filtered effluent discharges at a single outlet. In addition, the invention provides for the combined discharge of the filter backwash and the sludge from the treatment unit through a common outlet.

Thus, the general object of the present invention is to provide a single filtering system which may be operated in the above-described manner but which requires a lesser number of elements and less space than has been possible heretofore.

An additional object of the present invention is to provide a complete liquid purifying system which does not require external piping and which greatly reduces dispersion of residual floc in the treatment unit effluent.

Other objects and advantages of the present invention and, particularly those relating to the details of construction and operation, will become more fully apparent from the following description when read in conjunction with the accompanying drawings wherein.

Figure 1:
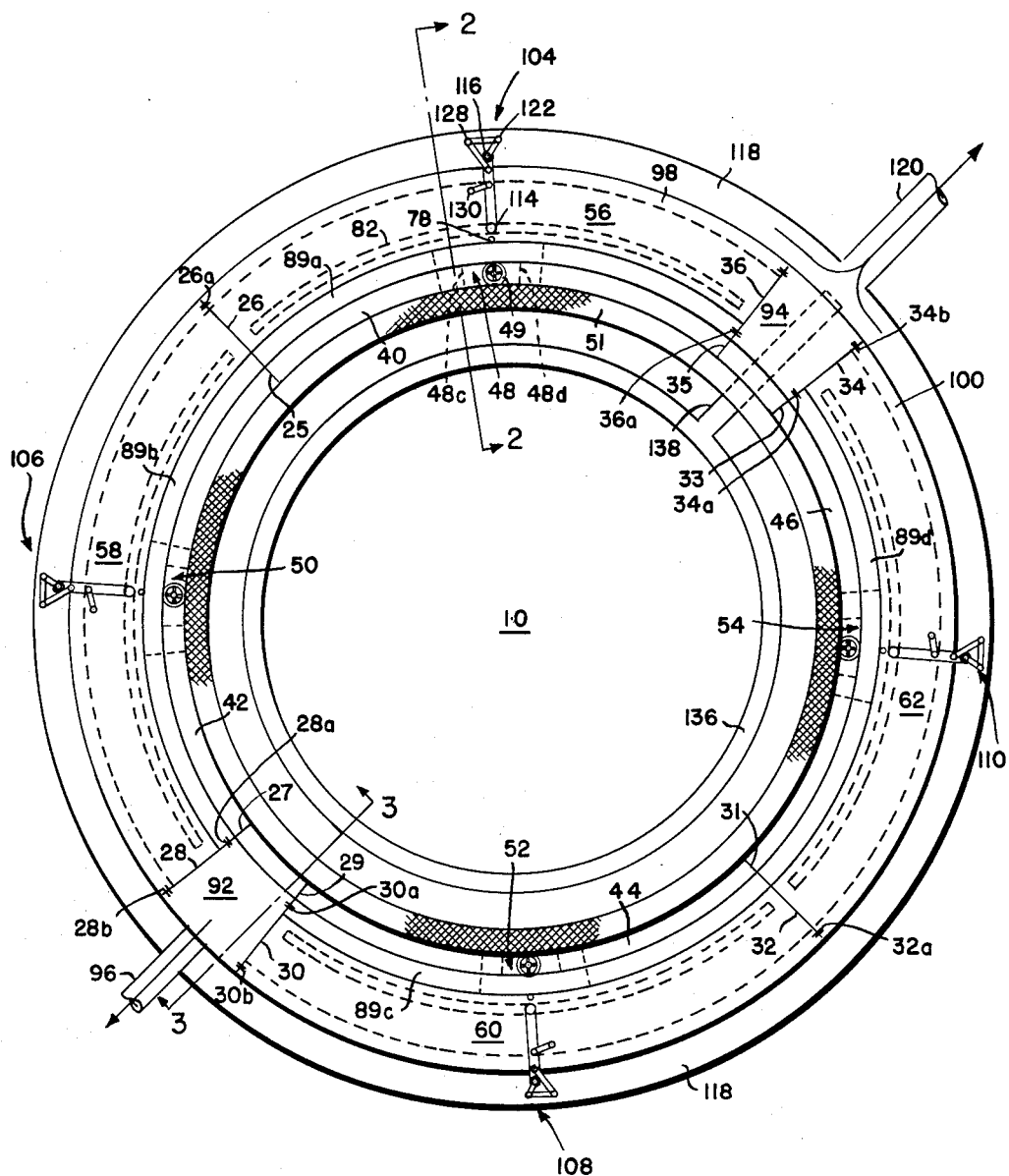
FIGURE 1 is a top plan view of the entire liquid purifying stystem.

Numeral 10 indicates a liquid treatment unit which is illustrated by way of example as being of the solids-contact type, although it will be understood that the present invention is equally applicable to a coagulator-clarifier type. The liquid treatment unit is defined by a circular bottom 12, supported by a concrete foundation 13, and an annular wall 14, the bottom and wall being illustrated as being metallic although it is to be understood that one or other or both may be composed of concrete in accordance with the design of such reactors. However, it will be noted that wall 14 is a common-wall between reactor 10 and both launder 20 and filter 16, the latter including annular walls 22 and 18, respectively, which are positioned concentrically about the treatment unit 10.

Figure 2:
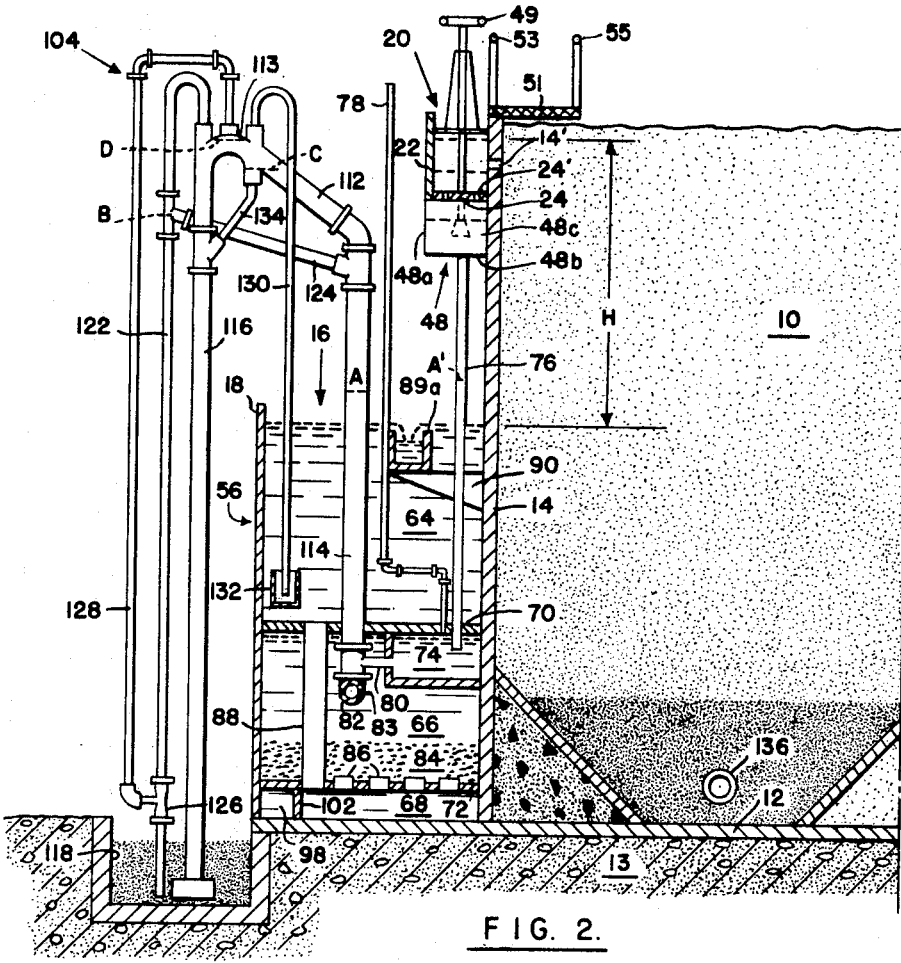
FIGURE 2 is a sectional view taken along the plane indicated by line 2—2 of FIGURE 1.

Launder 20 is defined by vertical walls 14, 22 and horizontal or bottom wall 24. Each of these walls extends continuously about the periphery of the reactor, however, radial partions 25, 27, 29, 31, 33 and 35 divide the launder into four arcuate segments 40, 42, 44 and 46. These segments are provided with depending chambers or pockets 48, 50, 52 and 54, respectively. As shown in FIGURES 1 and 2, chamer 48 is defined by circumferential walls 14 and 48a, horizontal walls 24 and 48b, together with radial walls 48c and 48d, it being understood that each of the other chambers is similarly constructed. Ports 14′ and 24′ are provided in walls 14 and 24, respectively, so that the effluent from unit 10 may enter each of the launder segments and their respective pockets. It will be noted that ports 14′ are evenly spaced around wall 14 and are located below the level of the water surface in the reactor to provide for uniform withdrawal of effluent even if the ports are not level and with a low enough velocity so that dispersal of any residual floc present is avoided.

Stand valves such as 49 are mounted on a suitable support above the location of their associated pockets for the purpose of closing off flow therefrom in the event that emergency repairs must be made to the filter associated therewith, these valves remaining open at all other times during both the filtering and backwashing cycles. Wall 14 also serves to support a circumferential catwalk 51 having railings 53, 55 so that access is provided to each of the stand valves.

Radial partitions 26, 28, 30, 32, 34 and 36 divide the annular filter unit into four separate filters 56, 58, 60 and 62. Since each of these individual filters is identical in construction, only filter 56 will be described in detail.

As shown in FIGURE 2, filter 56 is divided into three vertically stacked chambers 64, 66 and 68 by partitions 70 and 72. The filter is further provided with a fourth chamber 74 which is connected to chamber 48 by means of inlet line 76. Chamber 74 is an air separator tank and is provided with a vent pipe 78 which is operative to vent entrained air from the effluent to atmosphere. A short line 80 connects separator 74 to a distributor 82 which extends horizontally between radial partitions 26 and 36. The distributor is provided with a series of circumferentially positioned apertures 83 only two of which are visible in FIGURE 2 through which the influent is supplied to and backwash collected from all portions of chamber 66 at a substantially uniform rate per unit of filter area since the water travels a horizontal distance of only a few feet from walls 14 or 18 to and from the distributor.

The lower portion of chamber 66 is filled with a suitable filtering material such as sand so as to form a filter bed 84. Horizontal wall 72 contains a large plurality of strainers 86 having finely slotted openings (not illustrated) which retain the filter material without the need of supporting layers of gravel while allowing the filtered effluent to pass therethrough into plenum chamber 68.

At this point it should be noted that, in order to illustrate the entire system in a single figure, the width of the filter unit shown in FIGURE 1 has been greatly increased with respect to the illustrated diameter of unit 10 and that, in practice, the diameter of unit 10 may be in the order of ten times the width of the filter unit.

Plenum chamber 68 is in communication with an outlet pipe 88 which extends upwardly through chamber 66 to chamber 64 which, in turn, is provided with an outlet channel 89 including circumferential segments 89a, 89b, 89c and 89d each of which are supported by brackets 90 from wall 14. Since channel 89 is of the overflow type, the level of the filtered effluent remains fixed at the level shown in FIGURES 2 and 3 so that chamber 64 functions both as a settling chamber during the filtering cycle and as a storage chamber for subsequent backwashing as will be more fully described hereinafter. During the filtering cycle, the effluent from filter 56 flows through channel segment 89a and aperture 36a into clearwell 94. Similarly, the effluent from the other filters flows through channel segments 89b, 89c, 89d and apertures 28a, 30a, 34a, respectively, into clearwells 92 and 94.

Clearwell 92 is in communication with a final outlet pipe 96 through which the effluent passes to the service pumps. Effluent from clearwell 94 flows into clearwell 92 through semi-annular ducts 98 and 100 formed by bottom 12, partition 72 and walls 14 and 102, wall 102 being a common wall for the duct and plenum chamber 68 as shown in FIGURE 2. It will be understood that this communication between the clearwells is provided by apertures 26a and 32a located in radial partitions 26 and 32, respectively.

In order to automatically backwash the filters, each of filters 56, 58, 60 and 62 includes a siphon initiating and terminating unit 104, 106, 108 and 110, respectively. Each of these units is identical in structure and operation, and hence, only unit 104 associated with filter 56 will be described in detail. This unit includes a siphon line 112 comprised of a radially inner leg 114, and elbow 113 and a radially outer leg 116. Leg 114 is in communication with distributor 82, whereas, leg 116 empties into annular sump 118 having a single discharge 120. Leg 114 is also in communication with an ejector line 122 through ejector priming line 124. The upper end of ejector line 122 above line 124 is in communication with elbow 113 and the lower end of the ejector line contains a venturi 126, the throat of which is in communication with elbow 113 through vacuum line 128. The elbow is also in communication with chamber 66 through vacuum breaker line 130 the lower end of which is positioned within a cup 132. Lastly, the upper end of leg 114 immediately below the elbow is in communication with leg 116 through a siphon priming tube 134.

As will be described hereinafter in more detail, the siphon 112 draws the backwashing effluent through the filter bed thereby removing the filtered deposits therefrom and discharges the backwashing effluent and deposits into sump 118. However, at this point it should be noted that sump 118 is the same sump normally required by treatment unit 10 for receiving the sludge from sludge collector 136 through sludge outlet line 138. Thus, no additional sump or piping is required for the backwash effluents.

The operation of filter 56 will now be described in detail, it being understood that the operation of each of filters 58, 60 and 62 is identical to that of filter 56. Effluent from reactor 10 flows through ports 14' into launder 20 from whence it flows through ports 24', pocket 48 and inlet line 76 to air separator tank 74. The entrained air rises to the top of separator tank 74 from which it is vented to atmosphere through vent pipe 78, the effluent passing through line 80 and circumferentially positioned ports 83 in distributor 82 whereby the effluent is distributed evenly over the top of filter bed 84.

At this point it should be noted that the above described inlet path for the influent to the filter is of minimum length and contains a minimum number of turns so that dispersion of residual floc is substantially avoided with the effluent velocity being in the order of one foot per second.

Figure 3:
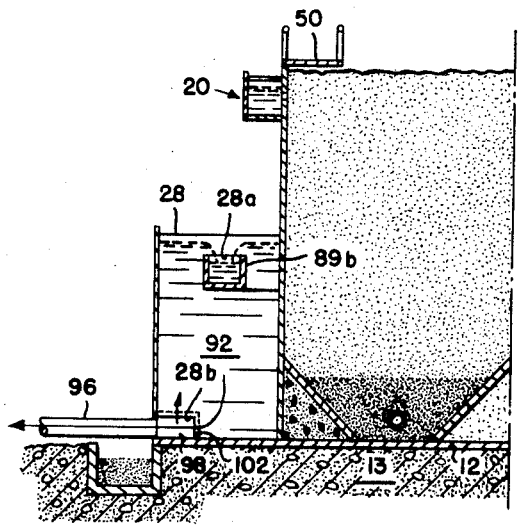
FIGURE 3 is a sectional view taken along the plane indicated by line 3—3 of FIGURE 1.

The effluent in chamber 66 filters down through bed 84 and through strainers 86 into plenum chamber 68 from which it passes upwardly through line 88 and fills storage chamber 64. It will be readily understood that the rise of fluid in line 88 and chamber 64 is due to the operating head designated H in FIGURE 2 which is variable but which is always above the edges of channel 89. From chamber 64 the filtered effluent flows into clearwell 94 through orifice 36a in radial partition 36. From clearwell 94 the effluent may flow through both of semi-annular conduits 98 and 100 and discharge into clearwell 92 as shown in FIGURES 1 and 3. Clearwell 92 is also supplied with additional effluent coming from filter 62 via duct 89d, clearwell 94 and duct 100. In addition, clearwell 92 is supplied with effluent directly from filters 58 and 60 through ducts 89b, 89c and orifices 28a and 30a in radial partitions 28 and 30, respectively. All of the effluent in clearwell 92 is then discharged through final outlet pipe 96 to the service pumps.

Throughout the above-described filtering cycle, the level of the effluent in storage chamber 64 is fixed due to the continuous overflow into duct 89 and this stored effluent provides a fixed volume of effluent for use in the subsequent backwashing cycle. However, the level in inlet pipe 76, pocket 48 and launder 20 is variable during the filtering cycle and is dependent upon the increase in resistance to flow caused by the build up of deposits in the filter bed. Thus, as the flow resistance increases, the level of influent in pipe 76 increases so that the rate of flow through the filter remains constant during the filtering cycle.

When the filter bed is initially clean, the influent is at level A in pipe 114 and at level A' in pipe 76, the latter level being a few inches higher than the former due to a slight loss of head in flowing through tank 74 and line 80 which connect pipes 114 and 76. However, as deposits build up in the filter bed, the resistance to flow increases so that the level of liquid rises to level B in pocket 48 as well as in the siphon and in line 124 at which point the water spills into ejector line 122 and flows through venturi 126 thereby producing a partial vacuum in line 128 which reduces the pressure above the water in siphon 112. This reduction in pressure assists the rise in siphon 112 until the water reaches level C at which point it flows through the primer tube 134 and into leg 116 which entrains air and draws it from the siphon tube so that the pressure in leg 116 and elbow 113 is reduced still further. This further pressure reduction is sufficient to cause the water to rise to level D in elbow 113, hence, full flow occurs through the siphon which initiates the backwashing cycle.

During this cycle, the major flow is from chamber 66 through the siphon to the sump although the influent from inlet 76 continues to flow and is also passed through the siphon so that the level in this pipe 76 eventually drops down to level A'. During backwashing, the water in storage chamber 64 passes down through conduit 88 into the plenum chamber and upwardly through the filter bed in chamber 66 and out through siphon to waste. This action effectively backwashes the filter bed removing the deposits therefrom and carrying them through the siphon line into sump 118 from whence they pass to the sewer through outlet 120.

The above-described backwashing cycle continues until the level in the storage chamber 64 drops below the edge of cup 132 which is rapidly emptied by flow through vacuum breaker line 130 so that this line draws air which breaks the suction in the siphon line. This automatically terminates the backwashing cycle and automatically initiates the filtering cycle which cycles are obviously repetitive.

It will be noted that the location of tank 74 below the storage chamber 64 prevents the tank from emptying during backwashing so as to prevent premature siphon breaking through vent 78.

Referring now to the entire system as shown in FIGURE 1, it will be apparent that each of the filters operates individually so that valve 49 of any filter may be closed and operation terminated in order to make repairs on one filter unit without terminating the operation of other filter units. Furthermore, it will be obvious that the cycling operation of each filter may be staggered so that only one filter is backwashing at any particular time. In addition, all of the filters may be in their respective filtering cycles at the same time since the filter cycle is much longer than the backwashing cycle. Thus, at least three filters and sometimes four filters are in their respective filtering cycles at all times. As a result, the disclosed system is capable of producing a substantially constant and uninterrupted discharge through outlet pipe 96 to service regardless of the requirements for backwashing and repairing the individual filter units.

It will also be apparent that the disclosed system accomplishes the above-described operation with a minimum of separate elements and space since the various walls and partitions are so arranged as to perform double functions. In addition, the disclosed embodiment of a preferred form of the invention provides a further advantage in that it eliminates the need for separate, costly piping and separate foundations for clearwells and filters. Furthermore, this single foundation is also integral with the annular sump which functions as a discharge for the reactor sludge as well as the filter backwash.

Of course, numerous modifications will be readily apparent to those skilled in the art such as varying the number of filters and placing line 88 externally of the filter. Therefore, it is to be understood that the foregoing disclosure is intended to be illustrative rather than exhaustive and that the invention is not to be otherwise limited than as specifically set forth in the following claims.

What is claimed is:

1. In combination, a liquid purifying unit including means forming a base and an enclosing side wall,
    means forming a second wall surrounding said first wall,
    means forming a plurality of radial walls extending between said first and second walls, some of said walls collectively defining a plurality of individual filters, including filter beds, surrounding and integral with said purifying unit,
    means to provide fluid communication between the purifying unit and the surrounding filters,
    each of said filters filtering the effluent from said purifying unit and including means located above the filter beds and in communication therewith for storing filter effluent for subsequent backwashing,
    means forming at least one clearwell within the confines of said second wall, said clearwell providing a storage space confined by said first and second walls and extending substantially to the top of said means for storing filter effluent, and said clearwell being located circumferentially between ends of filters,
    means to provide fluid communication between the outlet of each filter and said clearwell for the gravity flow of filter effluent thereto, and
    automatic means responsive to filter clogging for individually backwashing the filtering bed in each of said filters by gravity flow of the stored filter effluent.

2. The combination according to claim 1 wherein said means to provide fluid communication between the purifying unit and the surrounding filters includes a launder at the upper portion of said walls arranged to receive flow from the upper portion of said purifying unit, individual filter inlet chambers for each filter beneath said launder, and a vertically extending pipe between the launder and each of said filter inlet chambers therebeneath.

3. The combination as claimed in claim 1 further including means forming a sump,
    means interconnecting said sump and said purifying unit for receiving the sludge therefrom,
    means interconnecting said sump and said backwashing means for receiving the backwash therefrom, and
    means for jointly discharging said sludge and backwash from said sump.

4. The combination as claimed in claim 3 wherein said base provides a common support for said purifying unit, said filters and said sump.

5. In combination, a liquid purifying unit including means forming a base and an enclosing side wall,
    means forming a second wall surrounding said first wall,
    means forming a plurality of radial walls extending between said first and second walls, some of said walls collectively defining a plurality of individual filters including filter beds, surrounding and integral with said purifying unit,
    means to provide fluid communication between the purifying unit and the surrounding filters,
    each of said filters filtering the effluent from said purifying unit and including means located above the filter beds and in communication therewith for storing filter effluent for subsequent backwashing,
    means forming a plurality of clearwells within the confines of said second wall, said clearwells providing storage spaces, each confined by said first and second walls and extending substantially to the top of said means for storing filter effluent, and said clearwells being located circumferentially between ends of filters,
    first conduit means to provide fluid communication between the outlet of each filter and said clearwells for the gravity flow of filter effluent thereto,
    second conduit means interconnecting all of said clearwells,
    discharge means connected to only one of said clearwells for discharging the effluent from all of said filters therethrough, and
    automatic means responsive to filter clogging for individually backwashing the filtering bed in each of said filters by gravity flow of the stored filter effluent.

6. The combination as claimed in claim 5 further including individual chambers located beneath each of said filter beds,
    said individual chambers being arranged to receive the filtrate passing through the filter beds thereabove,
    said first conduit means being formed in part by portions of said individual chambers and in part by portions of said second wall.

7. In combination, a liquid purifying unit including means forming a base and an enclosing side wall,
    means forming a second wall surrounding said first wall,
    means forming a plurality of radial walls extending between said first and second walls, some of said walls collectively defining a plurality of individual filters, including filter beds, surrounding and integral with said purifying unit,
    means to provide fluid communication between the purifying unit and the surrounding filters,
    each of said filters filtering the effluent from said purifying unit and including means located above the filter beds and in communication therewith for storing filter effluent for subsequently backwashing,
    means forming at least one clearwell, said clearwell providing a storage space confined by said first, second and radial walls and extending substantially to the top of said means for storing filter effluent, and said clearwell being located circumferentially between ends of filters,
    means to provide fluid communication between the outlets of a plurality of said filters and said clearwell for the gravity flow of filters effluent thereto, and
    automatic means responsive to filter clogging for individually backwashing the filtering bed in each of said filters by gravity flow of the stored filter effluent.

8. The combination as claimed in claim 7 wherein said means interconnecting a plurality of said filters and said clearwell comprises an overflow trough submerged in said effluent storage means for each of said filters.

References Cited by the Examiner

UNITED STATES PATENTS

| 2,340,842 | 2/44 | Reybold et al. | 210—256 XR |
| 2,878,935 | 3/59 | Magrath et al. | 210—264 XR |
| 2,878,939 | 3/59 | Aldrich | 210—256 XR |
| 2,879,893 | 3/59 | Stebbins | 210—108 |
| 3,118,835 | 1/64 | Butler et al. | 210—256 X |

HARRY B. THORNTON, *Primary Examiner.*

REUBEN FRIEDMAN, HERBERT L. MARTIN,
*Examiners.*